United States Patent
Totoni

(10) Patent No.: US 12,175,216 B2
(45) Date of Patent: Dec. 24, 2024

(54) DEVICES, SYSTEMS, AND METHODS FOR TYPE INFERENCING CODE SCRIPTED IN A DYNAMIC LANGUAGE

(71) Applicant: Bodo, Inc., Pittsburgh, PA (US)

(72) Inventor: Ehsan Totoni, Pittsburgh, PA (US)

(73) Assignee: Bodo, Inc., Pittsburgh, PA (US)

( * ) Notice: Subject to any disclaimer, the term of this patent is extended or adjusted under 35 U.S.C. 154(b) by 106 days.

(21) Appl. No.: 18/046,179

(22) Filed: Oct. 13, 2022

(65) Prior Publication Data
US 2023/0127192 A1 Apr. 27, 2023

Related U.S. Application Data

(60) Provisional application No. 63/271,962, filed on Oct. 26, 2021.

(51) Int. Cl.
*G06F 8/30* (2018.01)
*G06F 8/41* (2018.01)

(52) U.S. Cl.
CPC . *G06F 8/37* (2013.01); *G06F 8/41* (2013.01)

(58) Field of Classification Search
None
See application file for complete search history.

(56) References Cited

U.S. PATENT DOCUMENTS

| | | | | |
|---|---|---|---|---|
| 8,549,502 B2 * | 10/2013 | Husbands | | G06F 8/437 |
| | | | | 717/148 |
| 2006/0130021 A1 * | 6/2006 | Plum | | G06F 11/3624 |
| | | | | 717/140 |
| 2008/0320453 A1 * | 12/2008 | Meijer | | G06F 8/423 |
| | | | | 717/140 |
| 2010/0293530 A1 * | 11/2010 | Ivancic | | G06F 11/3608 |
| | | | | 717/126 |
| 2015/0347102 A1 * | 12/2015 | Lattner | | G06F 8/443 |
| | | | | 717/146 |

(Continued)

OTHER PUBLICATIONS

Chevalier-Boisvert, McVM: An Optimizing Virtual Machine for the MATLAB Programming Language, School of Computer Science, McGill University (Aug. 2009), p. 1-96. (Year: 2009).*

(Continued)

*Primary Examiner* — Ryan D. Coyer
(74) *Attorney, Agent, or Firm* — K&L Gates LLP

(57) ABSTRACT

A system configured to convert human-readable source code into computer-readable source code is disclosed herein. The system can include a processor and a memory configured to store a compiling engine that, when executed by the processor, causes the processor to: receive an input program comprising human-readable source code, wherein the human-readable source code comprises a complex function, type inference the complex function, thereby inferring a first set of potentially partial and imprecise data types for the input program; transform the type inferenced complex function and type infer again a number of times, type inference the transformed complex function, thereby inferring a full set of precise data types for the type inferenced input program; and generate an output program comprising machine-readable code, wherein the machine-readable code is fully optimized using the full set of precise data types.

20 Claims, 9 Drawing Sheets

(56) References Cited

U.S. PATENT DOCUMENTS

2016/0070567 A1* 3/2016 Furtwangler ....... G06F 11/3672
717/122
2018/0189042 A1* 7/2018 Noonan ................... G06F 8/53

OTHER PUBLICATIONS

Olmos et al., Turning dynamic typing into static typing by program specialization in a compiler front-end for Octave, Proceedings Third IEEE International Workshop on Source Code Analysis and Manipulation (Sep. 26, 2003), p. 141-150. (Year: 2003).*

International Search Report and Written Opinion received for International PCT Application No. PCT/US2022/078004, dated Jan. 27, 2023.

Chevalier-Boisvert, McVM: An Optimizing Virtual Machine for the MATLAB Programming Language, School of Computer Science, McGill University (Aug. 2009), p. 1-96.

Olmos et. al., Turning dynamic typing into static typing by program specialization in a compiler front-end for Octave, Proceedings Third IEEE International Workshop on Source Code Analysis and Manipulation (Sep. 26, 2003), p. 141-150.

Ehsan et. al., HiFrames: High Performance Data Frames in a Scripting Language, ARXIV.org, Cornell University Library (Apr. 7, 2017), p. 1-14.

* cited by examiner

DEVICES, SYSTEMS, AND METHODS FOR TYPE INFERENCING CODE SCRIPTED IN A DYNAMIC LANGUAGE

CROSS-REFERENCE TO RELATED APPLICATIONS

This application claims the benefit of priority under 35 U.S.C. § 119(e) to U.S. Provisional Patent Application No. 63/271,962, titled DEVICES, SYSTEMS, AND METHODS FOR TYPE INFERENCING CODE SCRIPTED IN A DYNAMIC LANGUAGE, filed on Oct. 26, 2021, the disclosure of which is herein incorporated by reference in its entirety.

FIELD

The present disclosure is generally related to machines configured to convert computer instructions into a lower-level form that can be read and executed by a machine and, more particularly, is directed to a compiler configured to iteratively type inference code to type and optimize a dynamic computer language.

SUMMARY

The following summary is provided to facilitate an understanding of some of the innovative features unique to the aspects disclosed herein and is not intended to be a full description. A full appreciation of the various aspects can be gained by taking the entire specification, claims, and abstract as a whole.

In various aspects, a system configured to convert human-readable source code into computer-readable source code is disclosed. The system can include a processor and a memory configured to store a compiling engine that, when executed by the processor, causes the processor to: receive an input program including human-readable source code, wherein the human-readable source code includes a complex function; type inference the complex function to infer a first set of undefined data types for the variables in the input program; transform the type inferenced complex function and infer types a number of times, wherein the number of times is based, at least in part, on the number of typing issues of the program associated with the input program, and wherein each transformation includes replacing operations with typing issues and forcing certain variables to be constant in the function among others; type inference the transformed complex function, thereby inferring a full set of precise data types for the input program; and generate an output program including machine-readable code, wherein the machine-readable code is fully optimized using the full set of precise data types.

In various aspects, a method of converting human-readable source code into computer-readable source code is disclosed. The method can include: receiving, via a processor of a compiling system, an input program including human-readable source code, wherein the human-readable source code includes complex functions; type inferencing, via the processor, the complex function to infer a first of undefined data types for the input program; transform the type inferenced complex function and infer types a number of times, wherein the number of times is based, at least in part, on the number of typing issues of the program associated with the input program, and wherein each transformation includes replacing operations with typing issues and forcing certain variables to be constant in the function among others. type inferencing the transformed complex function, thereby inferring a full set of precise data types for the input program; and generating an output program including machine-readable code, wherein the machine-readable code is fully optimized using the full set of precise data types.

In various aspects, a system configured to convert human-readable source code into computer-readable source code is disclosed. The system can include: a user subsystem configured to generate an input program; and a compiling subsystem communicably coupled to the user subsystem, wherein the compiling subsystem includes a processor and a memory configured to store a compiling engine that, when executed by the processor, causes the processor to: receive the input program including human-readable source code from the user subsystem, wherein the human-readable source code includes a complex function; type inference the complex function to infer a first set of undefined data types for the variables in the input program; transform the type inferenced complex function and infer types a number of times, wherein the number of times is based, at least in part, on the number of typing issues of the program associated with the input program, and wherein each transformation includes replacing operations with typing issues and forcing certain variables to be constant in the function among others; type inference the transformed complex function, thereby inferring a full set of precise data types for the input program; and generate an output program including machine-readable code, wherein the machine-readable code is fully optimized using the full set of precise data types.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Figure 1:
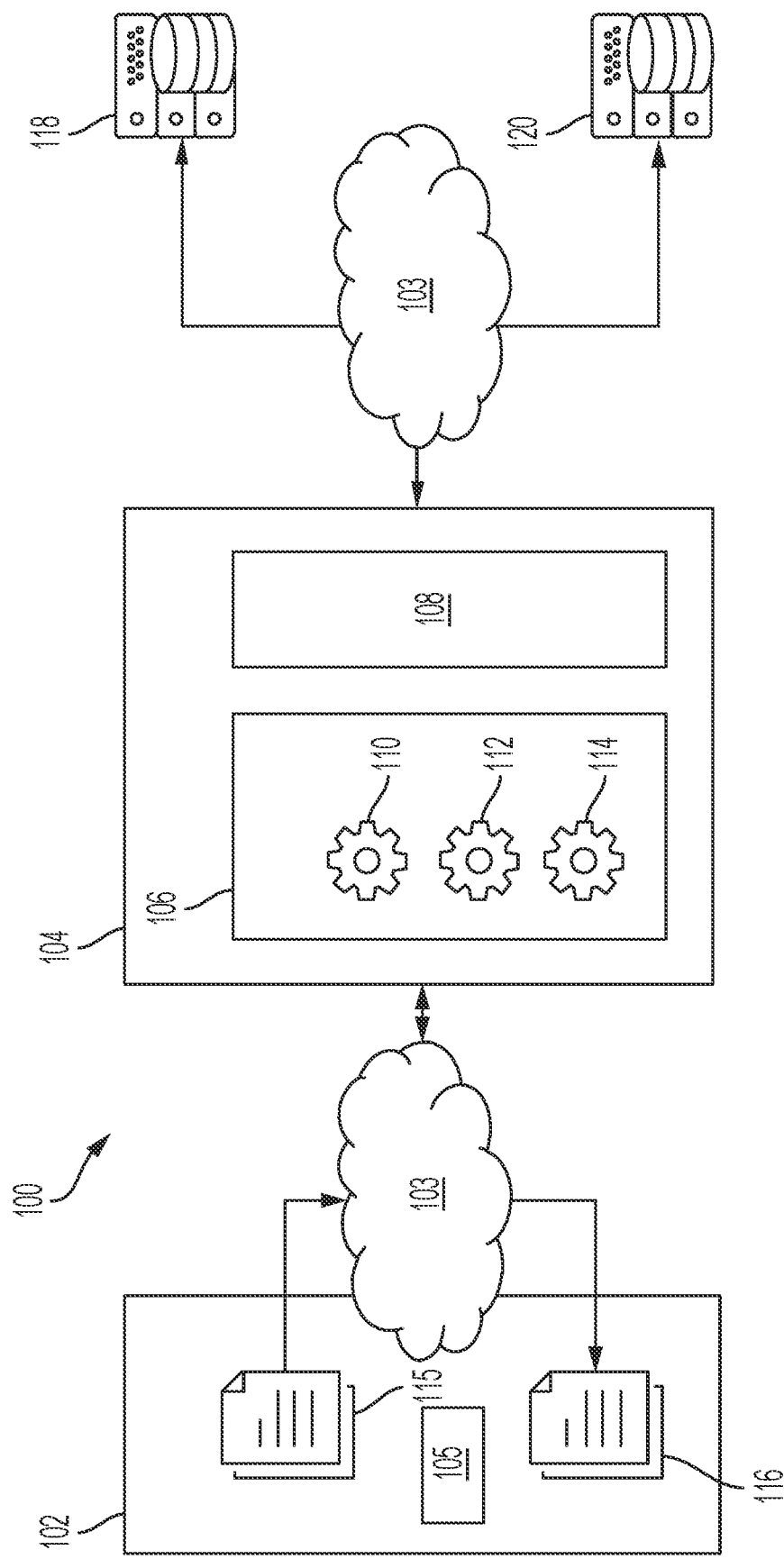
FIG. 1 illustrates a system configured to type inference code for dynamic languages, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of the present disclosure in any manner.

DETAILED DESCRIPTION

Numerous specific details are set forth to provide a thorough understanding of the overall structure, function, manufacture, and use of the aspects described in the present disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the appended claims.

Before explaining various aspects of the devices, systems, and methods for type inferencing code scripted in a dynamic language in further detail, it should be noted that the illustrative examples are not limited in application or use to the details of disclosed in the accompanying drawings and description. It shall be appreciated that the illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof.

In one aspect, the term "program," as used herein, refers to a sequence of instructions for a processor to execute. A program may be written as human-readable source code in file(s), or generated by another program and stored in computer memory, or sent by another system over a network.

In one aspect, the term "undefined data type," as used herein, can include any data type that could potentially complicate and/or preclude the type inferencing of code. For example, according to some aspects, an "undefined data type" can include a data type that is partial and/or imprecise.

In one aspect, the term "type inferencing," as used herein, refers to a process of automatically deducing, either partially or fully, the type of an expression during the compilation of human-readable code. For example, a compiler is often able to infer the type of a variable or the type signature of a function, without explicit type annotations having been given.

In one aspect, the system architecture disclosed herein is merely illustrative, and that any discrete systems and/or subsystems described herein can be distributed amongst and/or consolidated into any number of system components. For example, in some aspects, any of the compiling engine 110 (FIG. 1), the data analytics engine 112 (FIG. 1), and/or the parallelization engine 114 (FIG. 1) can be locally stored on a user subsystem 102 (FIG. 1), such that their respective functions are performed locally on the user subsystem 102 (FIG. 1). Conversely, the compiling engine 110 (FIG. 1), the data analytics engine 112 (FIG. 1), and/or parallelization engine 114 (FIG. 1) can be distributed across several internet 103 (FIG. 1) connected systems. As such, it shall be appreciated that any steps of any of the processes disclosed herein can be performed by any one of the system 100 (FIG. 1) components.

The conversion of computer code from a human-readable format to a machine-readable format is a resource-consuming, albeit necessary, process for most software developers. Although human-readable formats can be easily understood by a person, machine-readable formats are required for efficient computer-based encoding and decoding. As such, compilers are commonly employed to translate computer code from a human-readable format (e.g., source, high-level, etc.) to a machine-readable format (e.g., object, low-level, assembly, etc.), which results in an executable computer program. In order to accomplish this, known compilers require knowledge of data types, which is essential for the optimization of the resulting programs for faster execution. Some dynamic languages, such as Python, are interpretive, meaning the program itself is responsible for invoking a different program to properly execute the correct operation based on input types. For example, given the expression "a+b" the interpreter should invoke integer addition if "a" and "b" are integers but string concatenation if "a" and "b" are strings. This adds significant overhead to the program execution and prevents the proactive optimization and transformation of a code, including automatic parallelization which is necessary to take advantage of multiple processing units (CPU cores) in modern computer systems. Thus, optimizing a code scripted in a dynamic, interpretive language (e.g., Python) usually requires a significant amount of human intervention, which is expensive and time consuming.

Type inference is one technique that is commonly employed by known compilers to assist in such interpretations. During a type inference operation, the compiler may infer data types and/or program values based on available information. For example, some compilers, such as Numba®, can compile some functions scripted in Python based on input types and/or type constraints of the operations comprising the function. Such compilers typically include algorithms that iterate through constraints and update data types until they achieve convergence on a point where all of the variables have a precise data type. However, for dynamic languages like Python, there is no guarantee that the type inference operation will succeed. For example, some functions employed by the program can be inherently type unstable, such as the function of Example 1, presented below. This means the compiler cannot assign a precise type to each and every variable used in the function.

```
a = 1
if flag:
    a = "ABC"
```

Example 1—An Example of an Inherently Type Unstable Function

Specifically, variable "a," as used in the above function, can be interpreted as either an integer or a string, depending on the runtime value of "flag", which causes the precise type inferencing attempted by the compiler to fail. In other words, known compilers cannot possibly—let alone efficiently—compile complex inputs, such as data frames. Although alternatives exist for improving performance over Python, including non-standard application programming interfaces ("APIs") such as Spark, such alternatives are not compilers. Such APIs, however, merely emulate compilers in the background using libraries that do not generally output fully optimized machine-readable source code. As such, known compilers and alternatives, such as APIs, are incapable of type inferencing interpretive, dynamic languages, which poses a technological limitation and thus, a serious technical challenge for software developers seeking to employ optimized machine code. Specifically, this technological challenge arises from a trade-off between simplicity and performance. Known compilers and alternatives, such as APIs, use limited type inference operation that can automate a portion of the human-to-machine transformation, but ultimately fails to converge on a precise type for many complex inputs. As codes become more sophisticated, the number of complex inputs in an average program is increasing and thus, there is a significant amount of human-readable code that known compilers and APIs cannot transform into optimized machine-readable format. Moreover, known compilers and alternatives are incapable of providing auto-parallelization, which breaks large technical problems into smaller, discrete pieces that can be simultaneously solved by multiple processors. Accordingly, there is a need for improved devices, systems, and methods that can iteratively type inference code scripted in a dynamic language. Such devices, systems, and methods should be capable of simultaneously providing simplicity and performance, while providing automatic-parallelization.

Referring now to FIG. 1, a system 100 configured to type inference code for dynamic languages is depicted in accordance with at least one non-limiting aspect of the present disclosure. According to the non-limiting aspect of FIG. 1, the system 100 can include a user subsystem 102 communicably coupled to a compiling subsystem 104, such that the compiling subsystem 104 can receive an input program 115 from the user subsystem 102. According to the non-limiting aspect of FIG. 1, the user subsystem 102 is communicably coupled to the compiling subsystem 104 via a communications network 103, such as a global computer network generally referred to as the Internet. However, the present disclosure contemplates many aspects in which the access point 104 may employ other known means of communicably coupling the user subsystem 102 to the compiling subsystem 104, including a wired connection (e.g., wired connection, USB), an ad hoc wireless network (e.g., Bluetooth, near-field communication, etc.) or an infrastructure wired or wireless network (e.g., WiFi, local area network, etc.). The compiling subsystem 104 can further include a processor 105 configured to perform the required processing functions associated with the receipt, generation, and/or transmission of the input program 115. According to some non-limiting aspects, the user subsystem 102 can further include a memory 107 coupled to the processor 105 configured to store one or more engines.

According to the non-limiting aspect of FIG. 1, the compiling subsystem 104 can be configured to receive the input program 115 from the user subsystem 102 via the network 103 and generate an output program 116 based, at least in part, on the input program 115. The compiling subsystem 104 can subsequently return the output program 116 to the user subsystem 102 via the network 103. The input program 115 can be a code written in a human-readable format (e.g., source, high-level, etc.). According to some non-limiting aspects, the code of the user input program 115 can be scripted in a dynamic language, such as JavaScript, Python™, Ruby, PHP, Lua, R, Matlab, Julia and/or Perl, amongst others. For example, the code of the input program 115 can be scripted in Python and include a complex function, such as the code of Example 2, presented below.

```
@bodo.jit
def get_stats( ):
    ...
    df["latency"] = new_array
    df["latency"].sum( )
    df["latency"].mean( )
```

Example 2—An Example Function of Input Program 115 for Use Via the System 100 of FIG. 1

The compiling subsystem 104 can include a processor 108 and a memory 106 configured to store one or more engines 110, 112, 114 configured to process the input program 115, when executed by the processor 108 and generate an output program 116. The output program 116, for example, can include a code corresponding to the input program 115 but in a machine-readable format (e.g., parallel binary with MPI, etc). For example, the compiling subsystem 104 can generate the output program 116 by processing the input program 115 via a compiler engine 110, an analytics engine 112, and/or an auto-parallelization engine 114 stored in the memory 106. The compiler subsystem 114 can then transmit the output program 116 back to the user subsystem 102 via the network 103. Specifically, the compiler engine 110, the analytics engine 112, and/or the auto-parallelization engine 114 can be individually and/or collectively implemented to utilize program transformations on the input program 115, thereby implementing an algorithmic type inference-based compiler technique 200 (FIG. 2) to handle as many typing issues within the input program 115 as is possible. Although this technique 200 (FIG. 2) will be described in further detail herein, it shall be appreciated that the engines 110, 112, 114 of the compiler subsystem 104 are specifically configured to broaden the type inference capabilities of known compilers, thereby solving the aforementioned technological challenges. The engines 110, 112, 114 enable the compiler subsystem 104 of the system 100 of FIG. 1 to compile input program 115 that include complex and/or inherently type unstable functions, and facilitate automatic parallelization for data analytics and machine learning applications.

Still referring to FIG. 1, the engines 110, 112, 114 of the compiling subsystem 104 can iteratively type inference an input program 115, even if the input program 115 contains a complex function, such as the function illustrated in Example 2, presented above. Thus, the output program 116 can include code that corresponds to the complex code of the input program 115 but is presented in a machine-readable format. For example, having processed the input program 115, including the complex function of Example 2, through the compiling engine 110, the data analytics engine 112, and/or the auto-parallelization engine 114, the compiling subsystem 104 can generate an output program 116 that includes corresponding code in a machine-readable format, such as the code of Example 3, presented below. It shall be noted that the code of Example 3 is optimized, vectorized, and parallelized. Accordingly, the compiling subsystem 104 can transform human-readable input programs 115 that previously could not be compiled into machine-readable output programs 16.

```
vucomisd        %xmm0, %xmm0
setnp           %d1
jp              .LBB0__11
vaddsd          %xmm0, %xmm3, %xmm2
.LBB0__11:
vaddsd          %xmm0, %xmm3, %xmm1
vcmpunordsd     %xmm0, %xmm0, %xmm0
vblendvpd       %xmm0, %xmm3, %xmm1
```

Example 3—An Example Output Program 116 Generated by the System 100 of FIG. 1

The compiling subsystem 104 of the system 100 of FIG. 1 can be further integrated with one or more third-party tools and/or servers 118, 120, which can be used to assist the compiling subsystem 104 and/or enhance processing of the input program 115. For example, according to some non-limiting aspects, the compiling subsystem 104 can be integrated with one or more open-source libraries 118 and/or one or more high-performance computing tools 120. The one or more open-source libraries 118 can include open source data analysis, manipulation tools, and/or APIs that are built on top of the dynamic language, such as pandas, NumPy, and/or Numba, amongst others. The one or more high-performance computing tools 120 can include architectures, such as open-source libraries that are standard for distributed memory parallelization, including message-passing interfaces ("MPI"). As previously mentioned, parallelization performed by the compiling subsystem 104—and more specifically, the parallelization engine 114—with the assistance of third-party, high-performance computing tools 120, can dissect large computing tasks into smaller items distributed across a network of computing nodes, thereby utilizing the compiling techniques 200 (FIG. 2) disclosed herein to democratize high-performance computing for average programmers. One example of a parallelization process 400 (FIG. 4) that can be employed by the parallelization engine 114 (FIG. 1) will be described in more detail hereinbelow. Accordingly, the compiling subsystem 104 of FIG. 1 can allow the same code to run on laptops, cloud clusters, and/or edge devices efficiently.

Figure 2:
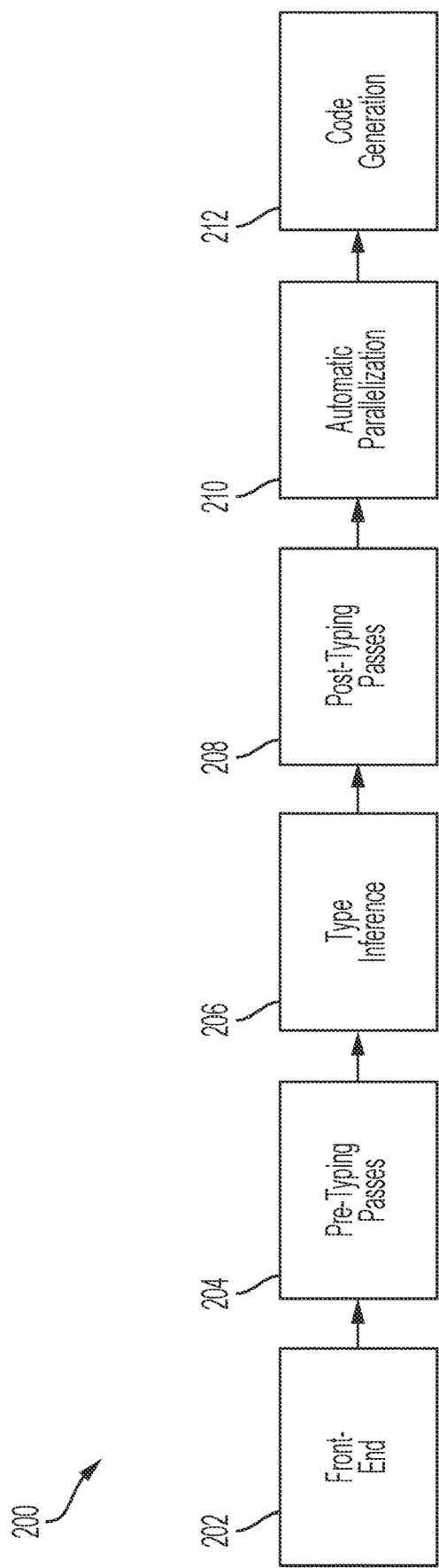
FIG. 2 illustrates a logic-flow diagram of a compiler program utilizing type inference technique, as employed by the system of FIG. 1, in accordance with at least one non-limiting aspect of the present disclosure.

Referring now to FIG. 2, a logic-flow diagram of a compiler program utilizing type inference technique employed by the compiling subsystem 104 of FIG. 1 is depicted in accordance with at least one non-limiting aspect of the present disclosure. According to one non-limiting aspect of FIG. 2, one or more of the engines 110, 112, 114 shown in FIG. 1 can include one or more algorithms configured to execute the technique 200 shown in FIG. 2. This significantly broadens the efficacy of type inference for input programs 115 (FIG. 1) that include complex or type unstable functions scripted in a dynamic language. Specifically, the type inferencing process 206 of technique 200 incorporates program instructions configured to type inference such functions, including those that could not be typed by known compilers and/or alternatives.

In accordance with a non-limiting aspect, the compiler with type inference technique 200 of FIG. 2 can include a front-end analysis 202, pre-typing passes 204, transformation-based type inferencing process 206, post-typing passes 208, automatic parallelization 210, and code generation 212. The front-end analysis 202 can include an initial analysis of the input program 115 (FIG. 1), wherein the compiling subsystem 104 (FIG. 1) can read the source program, divide it into core parts, and/or check the input program 115 (FIG. 1) for lexical, grammatical and/or syntax-based errors. During the pre-typing passes 204, the compiling engine 110 can take an output of the initial analysis of the input program 115 (FIG. 1) performed during the front-end analysis 202 and format it into a construct that the compiling engine 110 can understand. The first two functions 202, 204 can be performed by an algorithm of the analytics engine 112 (FIG. 1). The compiling engine 110 (FIG. 1) can then perform type inferencing process 206, which refers to the automatic detection of the type of an expression in the dynamic language of the input program 115 (FIG. 1). Post-typing passes 208 can then be performed by the compiling engine 110 (FIG. 1), wherein each pass takes the result of the previous pass as the input, and creates an intermediate output. In this way, intermediate code is improved pass-by-pass.

In further reference of FIG. 2, the parallelizing engine 114 (FIG. 1) can perform automatic parallelization 210 on an output of the type inference process 206 and post-typing passes 208, during which the compiling engine 110 can automatically identify code sections that have parallelism possibilities. During automatic parallelization 210, the parallelization engine 114 (FIG. 1) can generate parallel code that is functionally equivalent to the sequential code of the input program 115 (FIG. 1), but has additional constructs and/or code sections that, when executed, create multiple threads or processes. After parallelization 210, the final code is generated 212. The technique 200 of FIG. 2 enables the compiling system 104 (FIG. 1) to type inference input programs 115 with complex and/or type unstable functions and it further enables automatic parallelization for data analytics and/or machine learning applications. Although the present disclosure describes exemplary use cases, the technique 200 of FIG. 2 can be flexibly applied to other cases. Although the present disclosure describes the various engine 110, 112, 114 (FIG. 1) of the compiling subsystem 104 (FIG. 1) performing the aforementioned processes 202, 204, 206, 208, 210, 212, it shall be appreciated that any of the engines 110, 112, 114 (FIG. 1) can be alternately configured to perform any and/or all of the processes 202, 204, 206, 208, 210, 212 of technique 200. In other words, the algorithm functionality of the compiling subsystem 100 (FIG. 1) can be condensed and/or consolidated into one or more of the engines 110, 112, 114 (FIG. 1).

Figure 3:
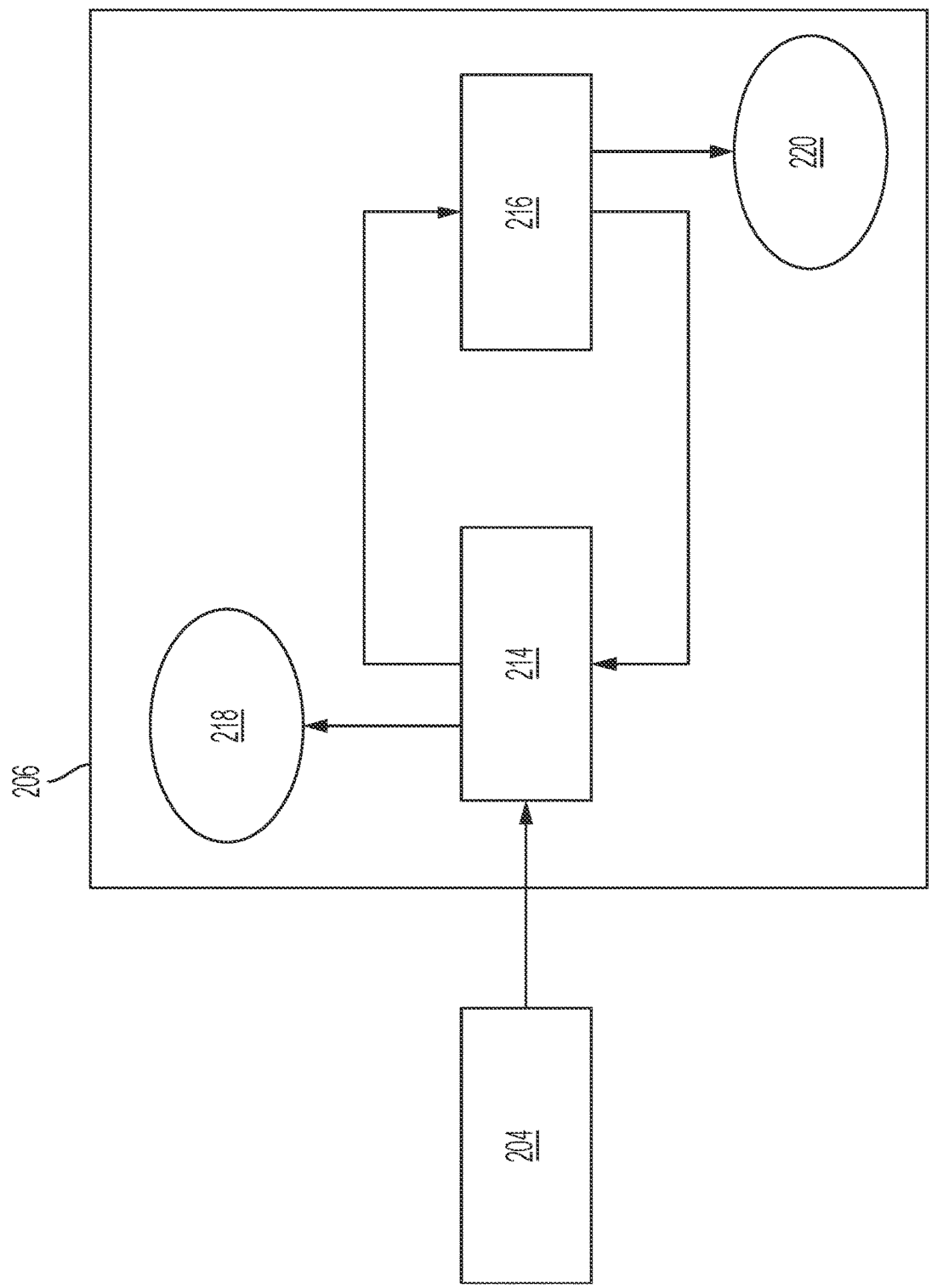
FIG. 3 illustrates a logic-flow diagram of the transformation-based type inferencing process employed by the technique of FIG. 2, in accordance with at least one non-limiting aspect of the present disclosure.

Referring now to FIG. 3, a logic-flow diagram of the transformation-based type inferencing process 206 of the technique 200 of FIG. 2 is depicted in accordance with at least one non-limiting aspect of the present disclosure.

According to the non-limiting aspect of FIG. 3, the compiling engine 110 (FIG. 1) can receive an input from the pre-typing pass process 204 (FIG. 2) employed by the technique 200 of FIG. 2. The transformation-based type inferencing process 206 can be performed via an iterative typing algorithm executed by the compiling engine 110 (FIG. 1). The algorithm will invoke type inferencing process 214 and infer as many types as possible. Successful finding of all data types without any errors, causes the algorithm to return successfully 218. Otherwise, the algorithm will invoke a transformation process 216, wherein it will apply as many program transformations as needed based the number of typing issues in the program. The transformations include replacing operations with typing issues and forcing certain variables to be constant in the function among others. If the algorithm cannot change the program in any way, the process will fail 220. Otherwise, the algorithm will invoke the type inference process 214 again on the transformed program, which is an output of the transformation process 216. Due to the irreversibility of the transformation process 216, the transformation-based type inferencing process 206 terminates with either success 218 or failure 220. In this way, the transformation-based type inferencing process 206 is specifically configured to prevent the compiling engine 110 (FIG. 1) from getting stuck in an infinite loop.

Example Input Functions

With reference to FIGS. 1 and 2, to illustrate the technological improvements enabled by the compiling subsystem 104 of FIG. 1, which executes the technique 200 of FIG. 2, the present disclosure will now describe several non-limiting aspects illustrating several transformations for data analytics applications written in Python, none of which would be possible with known compilers and/or alternatives. However, it shall be appreciated that the systems (e.g., the system 100 of FIG. 1), devices (e.g., the compiling subsystem 104 of FIG. 1), and techniques (e.g., the technique 200 of FIG. 2) disclosed herein can be applied to other domains and programming languages (e.g., JavaScript, Ruby, PHP, MATLAB, Julia, R, etc.) to provide similar benefits and achieve similar results.

For example, according to one non-limiting aspect, the system 100 of FIG. 1 can be implemented to add a new dataframe column to an existing dataframe. Dataframes are foundational data structures for data analytics that represent tabular data. For each dataframe variable, the compiler needs to know the names of the columns and their data types and type of row index to be able to optimize the program effectively. However, this is not straightforward in practice. A common pattern is adding new columns to existing dataframes. For example, consider Example 4, which presents one illustrative dataframe scripted in Python code, below.

```
1 df = pd.DataFrame({"A": [1, 2, 3], "B": [0.1, 0.2, 0.3]})
2 df["C"] = ["a1", "a2", "a3"]
```

Example 4—An Example of a Dataframe Function, which can be Included in an Input Program According to this non-limiting aspect, the first line defines "df" as a dataframe with columns A and B, which have integer and float data types respectively. However, the second line assigns a new column, named C, that has the string data type. This second line could be anywhere in the program in general, so the compiler cannot assign a data type to "df" accurately and therefore, the code of Example 4 is inherently type unstable.

With reference to FIGS. 1-3, the system 100 of FIG. 1 can compile the input program 115 (FIG. 1), including the type unstable dataframe code of Example 4, due to the transformation-based type inferencing process 206 (FIGS. 2 and 3), as employed by the compiling subsystem 104. In this example, transformation process 216 (FIG. 3) of the transformation-based type inferencing process 206 (FIGS. 2 and 3) transforms the type unstable code of Example 4 into a type stable code, such as the code of Example 5, presented below, which can be type inferenced under the type inferencing process 214 (FIG. 3) of the type inferencing process 206 (FIGS. 2 and 3).

```
df = pd.DataFrame({"A": [1, 2, 3], "B": [0.1, 0.2, 0.3]})
df2 = df_add_column(df, "C", ["a1", "a2", "a3"])
```

Example 5—An Example Transformation of the Dataframe of Example 4

Specifically, transformation process 216 (FIG. 3) of the transformation-based type inferencing process 206 (FIGS. 2 and 3) creates an internal function "df_add_column," which adds a new column to the input dataframe and returns a new dataframe. Transformation process 216 (FIG. 3) also renames all later uses of "df" with "df2" and clarifies data types for type inferencing upon return to the type inferencing process 214 (FIG. 3). The transformation of the dataframe code of Example 5 to the type stable dataframe code of Example 5 is possible only if the new column statement (statement 2) post-dominates the dataframe creation (statement 1). This means that every program control flow path that includes the dataframe creation also includes the new column statement. This condition is true in most practical use cases and therefore, the compiler is able to handle the program successfully in most cases. Algorithm 1 demonstrates this transformation process in simple Pseudocode.

Algorithm 1 - Pseudo-code for transforming dataframe column setitem

```
for node in program_intermediate_representation:
    if node is setitem and get_type(node.target) is DataFrameType:
        df_def_label = get_definition_label(node.target)
        if post_dominates(get_label(node), df_def_label):
            new_target_df = create_variable( )
            new_node = create_call("df_add_column", new_target_df,
[node.target, node.index, node.value])
            replace_node(node, new_node)
            replace_variable_after_node(node, node.target, new_target_df)
        else:
            raise_user_error("dataframe type not stable")
```

Although the first pass of type inferencing process 214 (FIG. 3) employed by the transformation-based type inferencing process 206 (FIGS. 2 and 3) fails when it encounters the new column statement (statement 2) of Example 4, the transformation process 216 (FIG. 3) identifies the "setitem," or bracket syntax, operation on a dataframe (e.g., data type of "df" is known by this time) of Example 4 and transforms it to the new form of Example 5. This allows the algorithm to continue and eventually succeed in more cases. Accordingly, this is widely applicable to other applications that utilize type unstable dataframe functions, so the transformation process 216 (FIG. 3) illustrated in this example can be applied to a larger set of applications. Thus, it shall be appreciated that the dataframe code of Example 4 is merely illustrative and, according to other non-limiting aspects, the system 100 (FIG. 1) can utilize the technique 200 (FIG. 2) and transformation-based type inferencing process 206 (FIGS. 2 and 3) to compile user inputs 115 (FIG. 1) that include type unstable dataframes expressed in a number of different ways. For example, the technique 200 (FIG. 2) can be used for other common dataframe type change operations such as setting the index ("dataframe.index") and column names ("dataframe.columns"), amongst others.

According to another non-limiting aspect, the system 100 of FIG. 1 can be implemented to update a set of columns in a loop, assuming one or more columns need to be updated. For example, the input program 115 (FIG. 1) can include a dataframe update function, such as the Python code of Example 6, presented below.

```
for c in ["A1", "A2", "A3"]:
    df[c] = df[c] + 1
```

Example 6—An Example of a Dataframe Update Function, which can be Included in an Input Program The function of Example 6 is type unstable because the dataframe access column names are not known ahead of time. Hence, known compilers cannot assign a precise type to "df[c]".

In this example, the transformation process 216 (FIG. 3) of the transformation-based type inferencing process 206 (FIGS. 2 and 3) can identify that: 1) a dataframe is accessed in a loop using the loop variable, and 2) the loop range is constant. Accordingly, the compiling engine 110 (FIG. 1) can fully unroll the loop via the transformation process 216 (FIG. 3), effectively converting all access column names to constants. However, the transformation process 216 (FIG. 3) is further configured to only unroll loops if it is necessary, thereby avoiding the downsides of generic loop unrolling (e.g., unnecessary code size increase, inefficient processing, etc.). Algorithm 2 demonstrates this process in simple pseudo-code.

```
Algorithm 2: Pseudo-code for unrolling loops
to discover constants when necessary for v in require_const_in_loop_vars:
    loop = get_enclosing_loop(v)
    if var_depends_on(v, loop.index) and is_constant(loop.iterations):
        unroll_loop(loop)
```

According to other non-limiting aspects, the system 100 of FIG. 1 can be implemented to infer constants. For example, it is common that some variables need to be inferred as constants for an input program 115 (FIG. 1) and/or transformation to be type stable for compiling. As such, the compiling subsystem 110 (FIG. 1) must be capable of transforming 216 (FIG. 3) type unstable functions that such that certain values are constant as well, such as the loop range in the previous transformation. The technique 200 (FIG. 2) and more specifically, the transformation-based type inferencing process 206 employed by the algorithm can enable new techniques for constant inference, which enables more common cases to be handled. Example 7, presented below, illustrates a program that could be included in an input program 115 (FIG. 1) that updates all columns of a dataframe in a loop.

```
for c in df.columns:
    df[c] = df[c] + 1
```

Example 7—An Example of a Constant Inference Function, which can be Included in an Input Program The previous example requires "df.columns" to be known, which requires the type of "df" to be known (since column names are part of dataframe types). The transformation-based type inferencing process 206 (FIGS. 2 and 3) employed by the algorithm of the compiling engine 110 (FIG. 1) employs a type inferencing process 214 (FIG. 3) that provides the data type of "df", which enables the transformation process 216 (FIG. 3) to infer "df.columns" as constant and continue with the transformation. Another common example where the type inferencing process 214 (FIG. 3) can be similarly applicable is input programs 115 (FIG. 1) with a "df.loc[:, df.columns!="B"]" function, which selects all columns of "df" except "B". There are many other cases where iterative transformation-based type inferencing processes 206 (FIGS. 2 and 3) can enable a more effective constant inference.

There are also many function calls where the type inferencing process 214 (FIG. 3) can reveal what variables need to be constant, but the constant needs to be enforced by other techniques, for example, the function of Example 8, presented below, which performs a group by operation on a dataframe.

```
def f(c):
    df = pd.read_parquet("my_file.pq")
    return df.groupby(c).sum( )
f("A")
```

Example 8—An Example of a Group by Function, which can be Included in an Input Program In this case, "c" is the key of group by and should be known by the compiling subsystem 104 (FIG. 1) to the type inferencing process 214 (FIG. 3) the output properly (e.g., where keys become part of dataframe index). For example, the type inferencing process 214 (FIG. 3) can find the data type for "df", but might fail to type inference the group by operation. Thus, the transformation process 216 (FIG. 3) can identify the group by operation on the dataframe and enforce the key "c" to be constant. Since "c" is a function argument, the compiler 104 (FIG. 1) can specialize the function "f" based on the value of "c" and restart the compilation process 206 (FIGS. 2 and 3). In other words, there should be a separate version of "f" for each value of "c", so the function signature changes from a generic f(string) signature to a specialized f(literal("A")) signature. This change in the compilation strategy allows the iterative type inferencing process 206 (FIGS. 2 and 3) to continue and eventually succeed.

Example Input Programs

To further illustrate the technological improvements enabled by the compiling subsystem 104 of FIG. 1, which executes the technique 200 of FIG. 2, several non-limiting aspects will now be described by way of illustrative programs written in Python that can be transformed via the system 100 of FIG. 1. Once again, Python is used as an exemplary language. None of the following programs could be effectively—let alone efficiently—compiled by known compilers and/or alternatives. However, is shall be appreciated that the systems (e.g., the system 100 of FIG. 1), devices (e.g., the compiling subsystem 104 of FIG. 1), and techniques (e.g., the technique 200 of FIG. 2) described herein can be applied to other programs written in other domains and programming languages (e.g., JavaScript, Ruby, PHP, MATLAB, Julia, R, etc.) to provide similar benefits and achieve similar results.

Selecting columns from a dataframe requires the column list to be known during compilation time to determine the output schema. In this example, the compiler has to force "col_list" to be constant as part of the type signature of "f". The "bodo.jit" python decorator is the syntax for just-in-time compilation chosen in a current implementation in the compiling subsystem 104 (FIG. 1) as part of a large scale compute platform.

```
@bodo.jit
def f(df, col_list):
    return df[["A"] + col_list]
df = pd.DataFrame({"A": [1.0, 2.0, 3.0], "B": [1.2, 1.1, 3.1], "C": ["a1", "a2", "a3"]})
col_list = ["B", "C"]
print(f(df, col_list))
```

Example 9—An Example of a Dataframe Column Selection Program

Supporting most dataframe methods requires knowing the output schema during compilation time, but the schema can change in the user code at any point in the program. The example below is challenging to handle since "drop" is especially dependent on schema and can throw errors if our method is not implemented properly.

```
def f(df):
    df["C"] = 3
    return df.drop(["C"], 1)
df = pd.DataFrame({"A": [1.0, 2.0, 3.0], "B": [1.2, 1.1, 3.1]})
print(f(df))
```

Example 10—An Example of a Dataframe Schema Change Before Method Call

Setting new names for dataframe columns is common but it changes the dataframe schema. Handling this case in our approach is similar to setting a new column.

```
@bodo.jit
def f(df):
    df.columns = ["a", "b"]
    return df
df = pd.DataFrame({"A": [1.0, 2.0, 3.0], "B": [1.2, 1.1, 3.1]})
print(f(df))
```

Example 11—An Example of a Program for Setting Dataframe Column Names

Setting a new index can change the dataframe schema similar to setting a new column and needs to be handled similarly.

```
@bodo.jit
def f(df):
    df.index = ["a", "b", "c"]
    return df
df = pd.DataFrame({"A": [1.0, 2.0, 3.0], "B": [1.2, 1.1, 3.1]})
print(f(df))
```

Example 12—An Example of a Program for Setting Dataframe Index

It is a common pattern in Python to initialize an empty dataframe and set its data later in the program. However, this changes the dataframe data type and should be handled accordingly.

```
@bodo.jit
def f(df2):
    df = pd.DataFrame( )
    for _ in range(3):
        df = df.append(df2)
    return df
df2 = pd.DataFrame({"A": [1.0, 2.0, 3.0], "B": [1.2, 1.1, 3.1]})
print(f(df2))
```

Example 13—An Example of a Program for Filling Empty Dataframes

Dataframe join operations (e.g., "merge" in a language, such as Python) need to know join keys to determine the output dataframe's type. The reason is that key columns are merged together, but non-key columns are appended to the output dataframe and renamed if there is a name conflict. In the example below, output dataframe's column names are "A", "B_x", "B_y" if the join key is "A" but column names are "A_x", "B", "A_y" if the join key is "B".

```
@bodo.jit
def f(df, df2, key):
    return df.merge(df2, on=key)
df = pd.DataFrame({"A": [1, 2, 3], "B": [3, 4, 5]})
df2 = pd.DataFrame({"A": [4, 1, 1], "B": [6, 4, 8]})
print(f(df, df2, "A")) # column names: "A", "B_x", "B_y"
print(f(df, df2, "B")) # column names: "A_x", "B", "A_y"
```

Example 14—An Example of a Program to Join Keys

Similar to join keys, group by keys are necessary for determining the output type. Key columns become part of the output dataframe's index, but other columns will be the data. The example below demonstrates a common pattern where the key names are computed based on the input column names.

```
@bodo.jit
def f(df):
    return df.groupby(list(set(df.columns) - set(["A",
"C"]))).sum( )
df = pd.DataFrame({"A": [2, 1, 1, 2], "B": ["a", "b", "c", "c"],
"C": [1, 3, 1, 2]})
print(f(df))
```

Example 15—An Example of a Program for Group by Keys

The above functions and programs are merely exemplary of the how the transformation-based type inferencing process 206 (FIGS. 2 and 3) can be employed by the compiling engine 110 (FIG. 1) to compile user inputs 115 (FIG. 1), that known compilers and/or alternatives would not be able to compile. However, it shall be appreciated that the compiling engine 110 (FIG. 1) can employ the transformation-based type inferencing process 206 (FIGS. 2 and 3) to compile user inputs 115 (FIG. 1) that include many other functions and/or programs. Accordingly, the compiling subsystem 104 (FIG. 1) can be broadly applied to a number of other applications that utilize type unstable dataframe functions and/or programs.

The above examples further illustrate the technological improvement offered by the devices, systems, and methods of compiling disclosed herein. Specifically, the above examples illustrate functions and programs that could not be transformed via known compilers and alternatives. However, the compiling subsystem 104 (FIG. 1) and technique 200 (FIG. 2) employed by its various engines 110, 112, 114 (FIG. 1) can transform the above functions and programs efficiently using fewer resources, as will be described in reference to FIGS. 5 and 6. The compiling subsystem 104 (FIG. 1) also generates output programs 116 that are optimized, vectorized, and parallelized, which enables democratization of high-performance computing for important application domains such as machine learning and enhancements that were not previously attainable via known compilers and alternatives.

Figure 4:
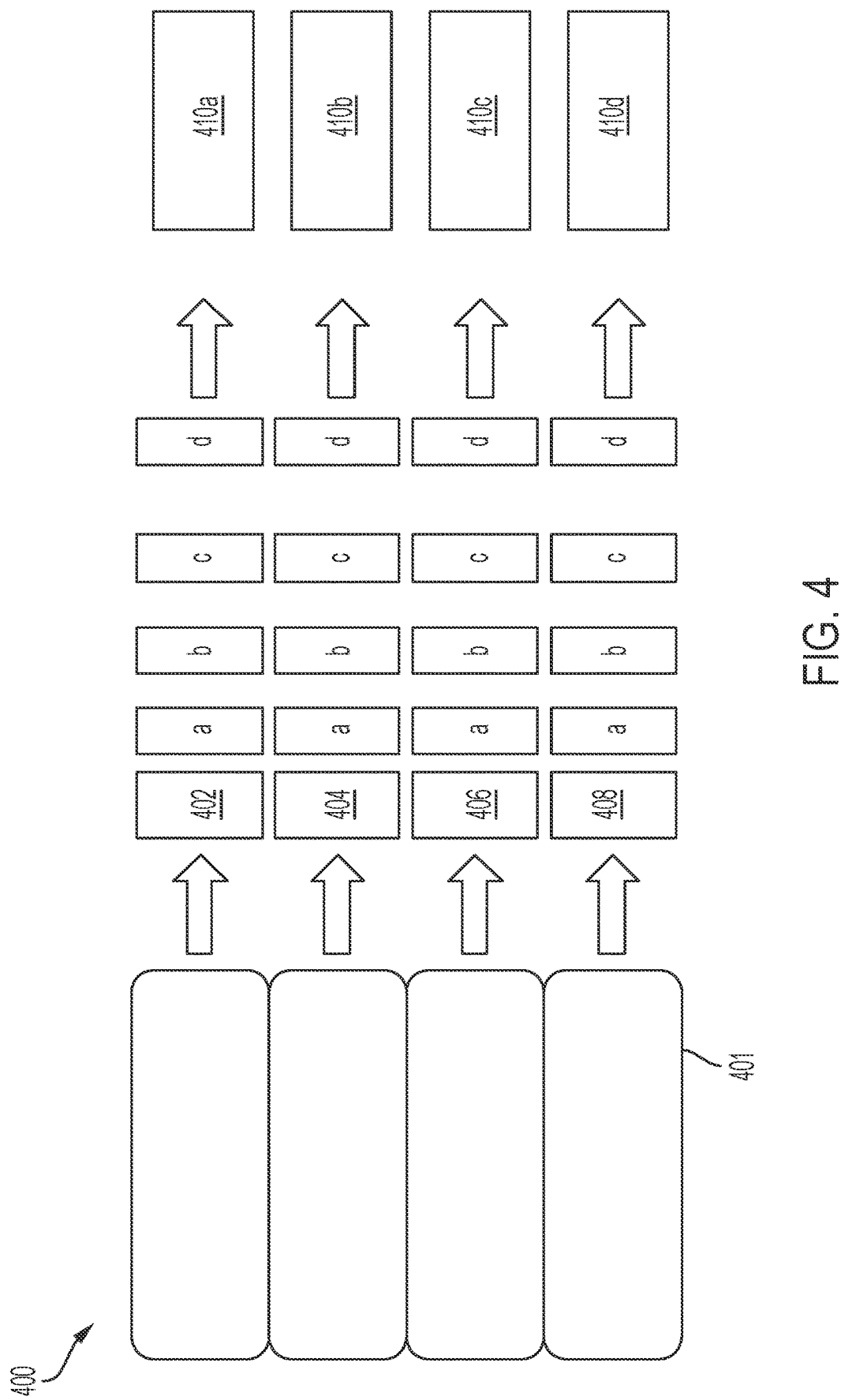
FIG. 4 illustrates a block diagram of an automatic parallelization process employed by the system of FIG. 1, in accordance with at least one non-limiting aspect of the present disclosure.

Referring now to FIG. 4, a block diagram of an automatic parallelization process 400 that can be employed by one or more of the engines 110, 112, 114 (FIG. 1) of the compiling subsystem 104 (FIG. 1) is depicted in accordance with at least one non-limiting aspect of the present disclosure. According to the non-limiting aspect of FIG. 4, the auto-parallelization engine 114 (FIG. 1) can perform the parallelization process 400. For example, the auto-parallelization engine 114 (FIG. 1) can take a large problem or task 401 associated with the input program 115 (FIG. 1) and break it into discrete problems or tasks 402, 404, 406, 408. The auto-parallelization engine 114 can further break the discrete problems 402, 404, 406, 408 down into even smaller tasks 402a-d, 404a-d, 406a-d, 408a-d, which can be delegated across a plurality of computing devices 410a-d, such that no one computing device 410a-d is overloaded. As used herein, the term "computing device" can include any server, personal computer, laptop, tablet, and/or mobile phone, amongst others.

Parallel computing, which is enabled via the auto-parallelization process 400 of FIG. 4, is an increasing necessity given the computational demands of data analytics and machine learning applications today. Furthermore, efficient parallel computing is unsupported by known compilers and alternatives. As previously noted, the parallel computing process 400 can involve breaking down large problems into smaller pieces that can be solved by multiple processors at the same time. This promotes efficiency and scalability because parallel applications can often utilize thousands of processor cores simultaneously to solve massive problems quickly. Historically, high-performance computing experts have parallelized programs manually, applying their acquired experience and understanding of algorithmic structure. Then, experts would have to modify the code so that large data structures and computations were divided into smaller ones that could be distributed across processors. Furthermore, experts would have to add code to coordinate communication across processors since to accommodate for data dependencies across computational pieces for non-trivial problems. This was a labor-intensive, cumbersome, and time-consuming process that required significant expertise. Accordingly, parallelization was limited in its application.

The auto-parallelization process 400, however, as employed by the auto-parallelization engine 114 (FIG. 1), enables the conversion of sequential code of an input program 115 (FIG. 1) to a parallel version, automatically. In one aspect, the auto-parallelization process 400 essentially automates the parallelization process that was historically and manually performed by high-performance computing experts. In other words, the auto-parallelization engine 114 (FIG. 1) transforms the compiling subsystem 104 (FIG. 1) into an unprecedented machine technologically configured to perform parallelization tasks that known compilers and alternatives were incapable of performing. Such auto-parallelization process 400 is necessary for democratization of computational power across various organizations and applications, which fulfills a long-felt need that has plagued computer science for decades. Notably, the efficiency and scalability of the auto-parallelization process 400 of FIG. 4 is significantly higher than any parallelization previously performed by experts, enabling the auto-parallelization engine 114 (FIG. 1) to address the efficiency and scalability challenges presented by data-intensive applications.

The automatic-parallelization process 400 of FIG. 4 is even more powerful when applied in conjunction with the transformation-based type inferencing process 206 (FIGS. 2 and 3). Specifically, the new inferential compiler technology employed by the compiling engine 110 (FIG. 1) can infer the structure of a program in an input program 115 (FIG. 1), which makes it far easier to automatically transform the code into a parallel version while managing any dependencies to be distributed across computing devices 410a-d. Integration with third party resources 118 (FIG. 1) and 120 (FIG. 1), such as Pandas, can further enable the compiling subsystem 104 (FIG. 1) to democratize compute power for all developers across organizations.

Aside from providing transformational and parallelization functionality beyond the capabilities of known compilers and alternatives, experimental benchmark testing indicates that the systems (e.g., the system 100 of FIG. 1), devices (e.g., the compiling subsystem 104 of FIG. 1), and methods (e.g., the technique 200 of FIG. 2) offer unprecedented speed, depending on the input program 115 (FIG. 1). Such performance indicates a potential for numerous advantages in many real-world use cases.

Figure 5:
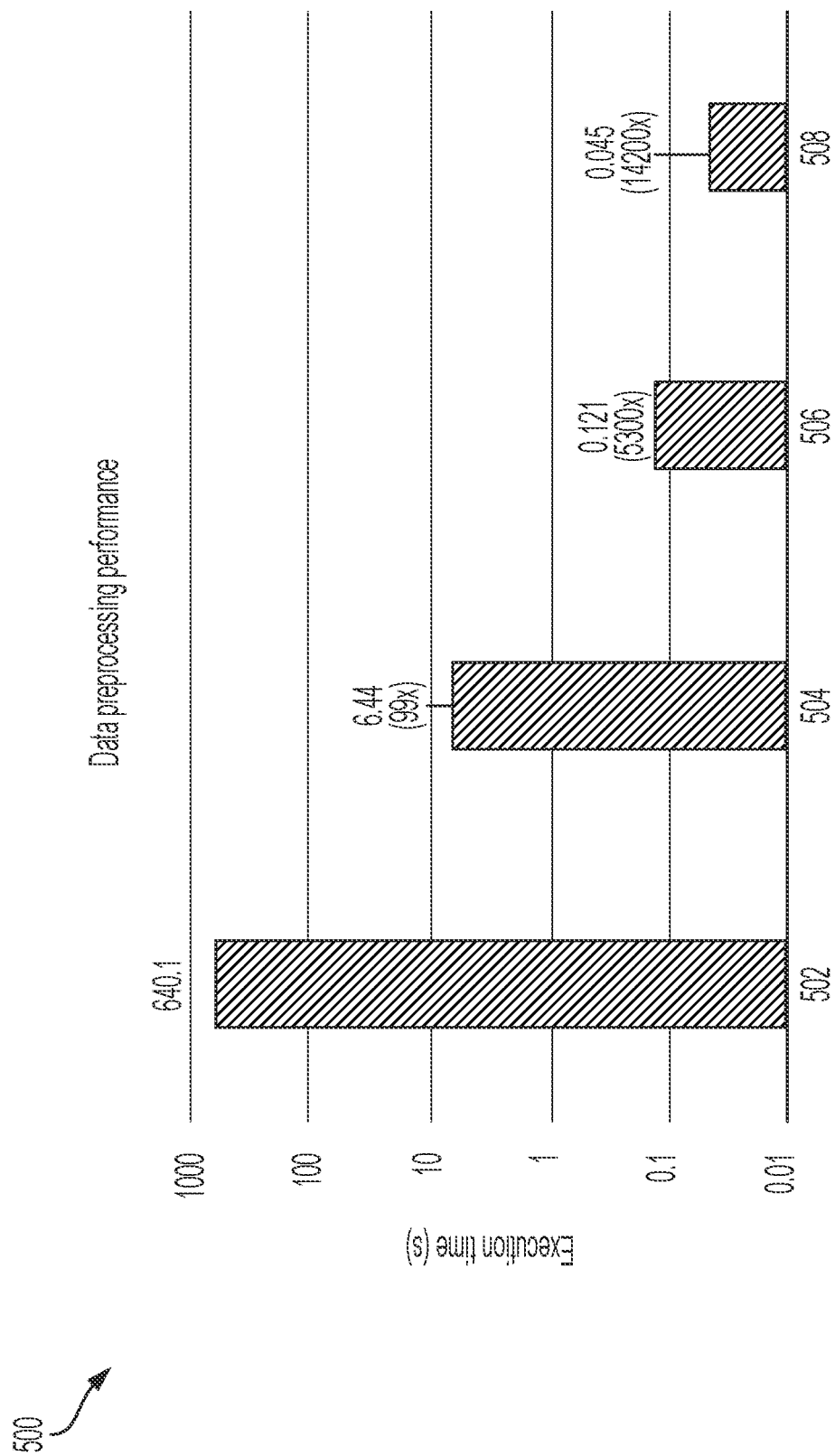
FIG. 5 illustrates a chart exhibiting the processing time of the system of FIG. 1 in comparison to the natural processing time of an exemplary dynamic language, in accordance with at least one non-limiting aspect of the present disclosure.
Figure 6:
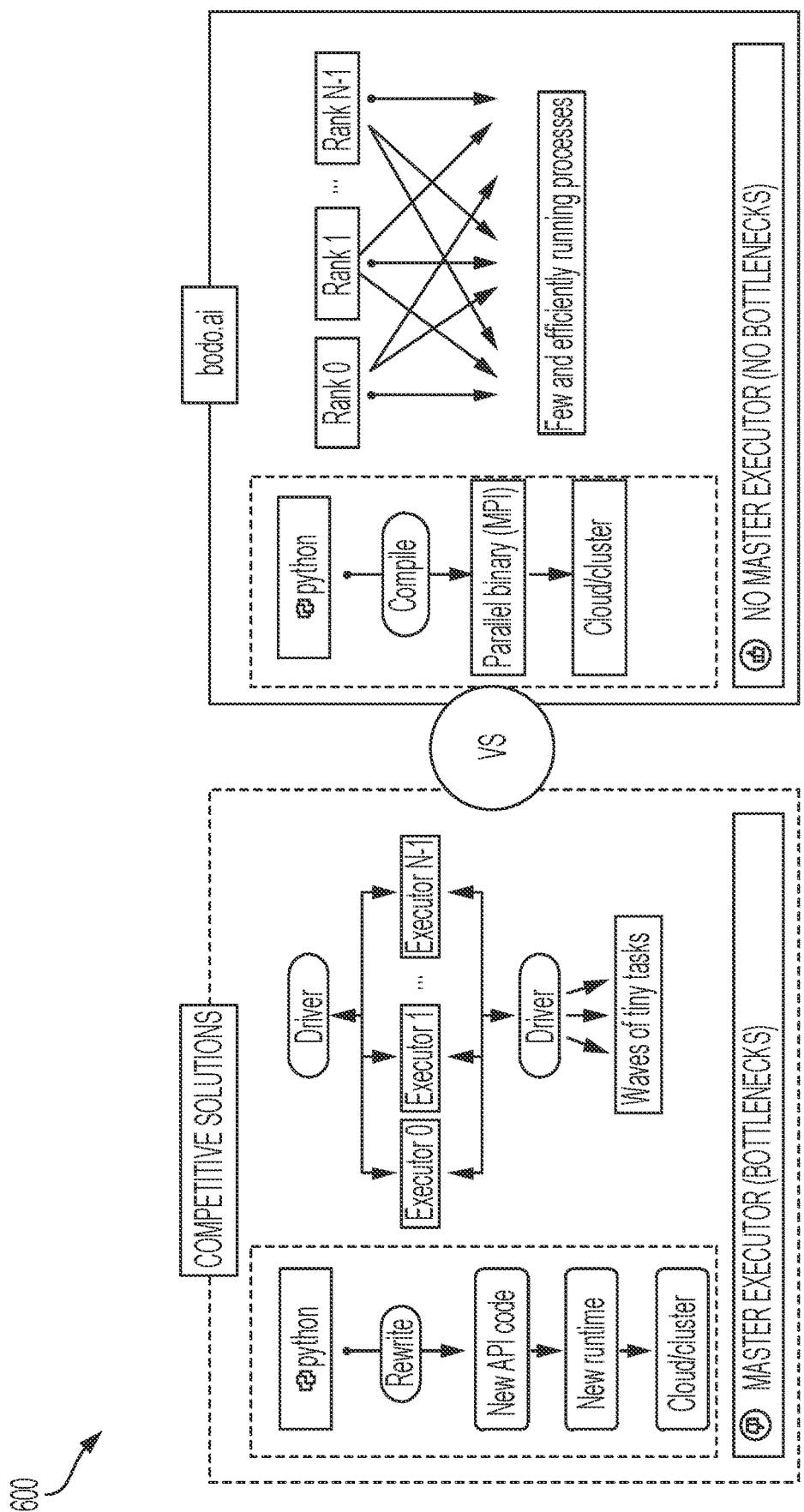
FIG. 6 illustrates a block diagram of an architecture of the system of FIG. 1 compared to a non-compiler-based alternative, in accordance with at least one non-limiting aspect of the present disclosure.

Referring to FIG. 5, a chart 500 illustrating the processing time of the compiling subsystem 104 (FIG. 1) in comparison to the natural processing time of an exemplary dynamic language (e.g., Python) is depicted in accordance with at least one non-limiting aspect of the present disclosure. According to the non-limiting aspect of FIG. 5, the chart 500 illustrates run times for a machine learning program in the telecommunication sector. Specifically, the machine learning program tested was configured to transform network logs into features that can be used by machine learning algorithms. The program created new columns for its main dataframe. In other words, the simulated program tested to produce the results of FIG. 5 employed many of the complex and/or type unstable functions and programs previously described. As such, the program was well suited for the implementation of the compiling subsystem 104 (FIG. 1) and technique 206 (FIG. 2), which enabled safe, efficient, and effective compilation.

According to the chart 500 of FIG. 5, the execution time required by the native processor (e.g., Python) implementation 502 are illustrated in comparison to the execution times required by a sing-core implementation 504, a single-node and 56-core implementation 506, as well as a four-node and 224-core implementation 508 of the compiling subsystem 104 (FIG. 1) of the present disclosure. The multi-core implementations 506, 508 were possible due to the auto-parallelization process 400 (FIG. 4) employed by the auto-parallelization engine 114 (FIG. 1) disclosed herein. As illustrated by the chart 500 of FIG. 5, the compiling subsystem 104 (FIG. 1) can be 99-times more efficient than the native processor implementation 502, when employing the sing-core implementation 504. However, the efficiencies are more significant when the parallelization engine 114 is employed to enable multi-core implementations 506, 508. The test established that the compiling subsystem 104 (FIG. 1) can realize over 14000-times efficiencies on a small cluster 508, effectively eliminating this program's bottleneck from the overall machine learning workflow.

Industry alternatives and non-compiler solutions (e.g., API's) to scale dynamic languages such as Python to work on large datasets were only developed because compiler-based solutions were not capable of compiling programs, such as the telecom program of FIG. 5, prior to the development of the compiling subsystem 104 (FIG. 4). Alternative solutions merely include libraries and still require significant manual rewriting of the native-language code in the APIs. Although the APIs are designed to be similar to Python, they require significant programmer effort to understand and use. Example libraries in this category include Apache Spark and Dask, amongst others. However, library solutions are usually designed as driver-executor distributed systems with significant performance implications. The program runs on the driver which is a single process similar to any regular Python program execution. However, the driver breaks up the API calls into tasks that are sent to executors, which return the results back to the driver when tasks are completed. This task-scheduling architecture essentially approximates parallelism while incurring significant overheads such as task scheduling and communication.

On the other hand, a compiler-based solution, such as the compiling subsystem 104 (FIG. 1) and technique 200 (FIG. 2) can optimize and parallelize native programs directly, avoiding major code rewrite efforts by the programmer. Furthermore, the compiling subsystem 104 (FIG. 1) can fully parallelize the program using a standard Single Program Multiple Data (SPMD) parallel architecture, without the need for a driver-executor distributed library. The chart 600 of FIG. 6 demonstrates these differences. Specifically, the absence of a master executor implemented by the compiling subsystem 104 (FIG. 1) streamlines and efficiently runs the fewer operations required to execute the input program 115 (FIG. 1), instead of the large number of small tasks a master executor needs to process in a known, API-based solution.

Figure 7:
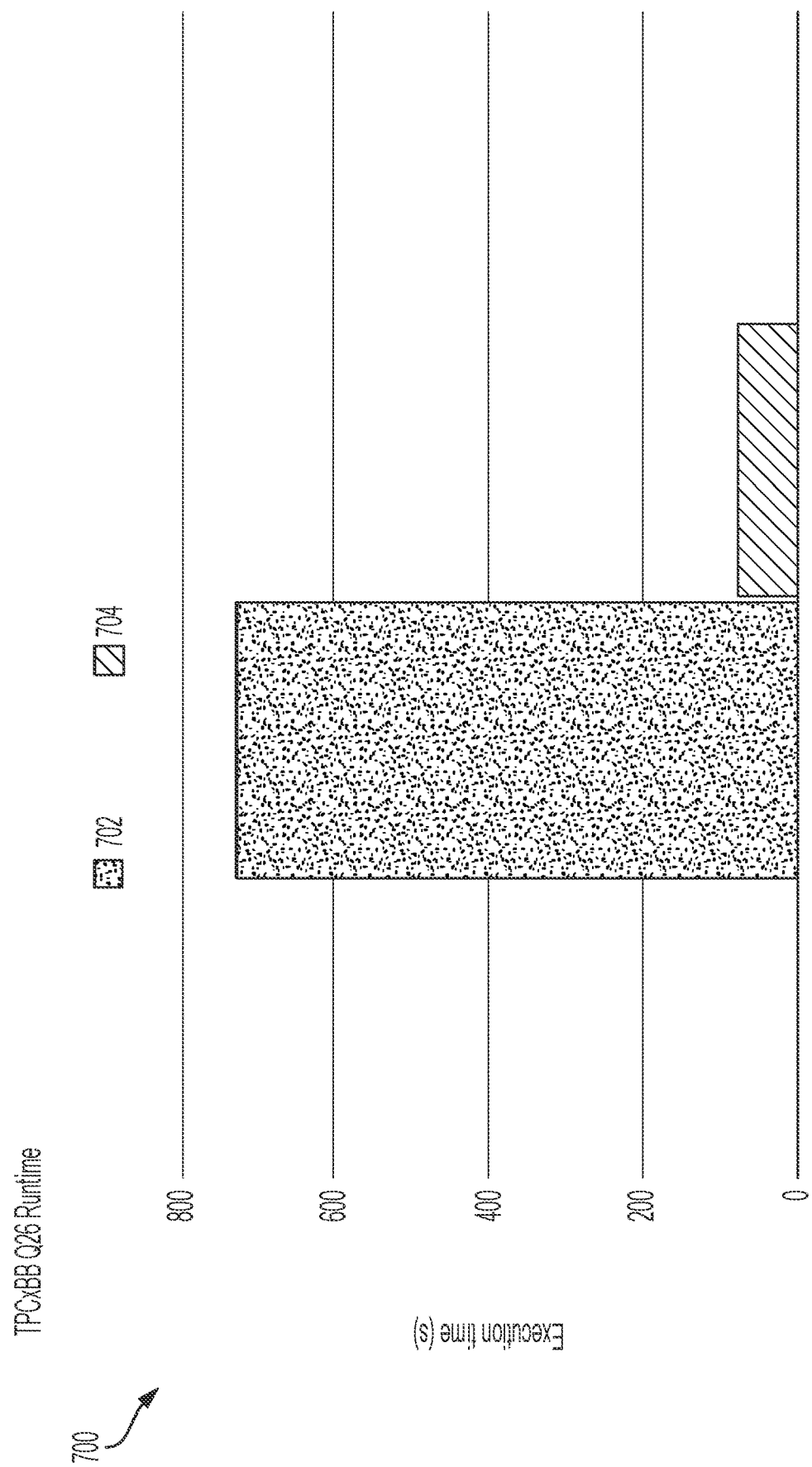
FIG. 7 illustrates a chart exhibiting the processing time of the system of FIG. 1 in comparison to the natural processing time of non-compiler-based alternative, in accordance with at least one non-limiting aspect of the present disclosure.

Referring to FIG. 7, a chart 500 illustrating the processing time of the compiling subsystem 104 (FIG. 1) in comparison to the processing time of an API-based solution is depicted in accordance with at least one non-limiting aspect of the present disclosure. Compiler solutions using the technique 200 (FIG. 2) employed by the compiling subsystem 104 (FIG. 1) are often significantly faster than the API-based alternatives due to the aforementioned reduction in overhead, enabled via auto-parallelization processes 400 (FIG. 4). The chart 700 compares the execution time of a compiling subsystem 104 (FIG. 1) implementation 704 versus an implementation 704 using an API-based alternative (e.g., Spark) for the TPCxBB Q26 industry standard benchmark. According to the non-limiting aspect of FIG. 1, the input program 115 (FIG. 1) had 52 billion rows and is 2.5 TB in size on disk (scale factor 40,000 of the benchmark suite). Both implementations 702, 704 used the same cluster, consisting of 125 server nodes (e.g., Amazon AWS c5n.18xlarge) and 4500 total CPU cores. The implementation 704 using the compiling subsystem 104 (FIG. 1) exhibited efficiencies of approximately ten-times using the technique 200 (FIG. 2) disclosed herein, which is transformational in terms of performance and cost for any big data analytics infrastructure.

Figure 8:
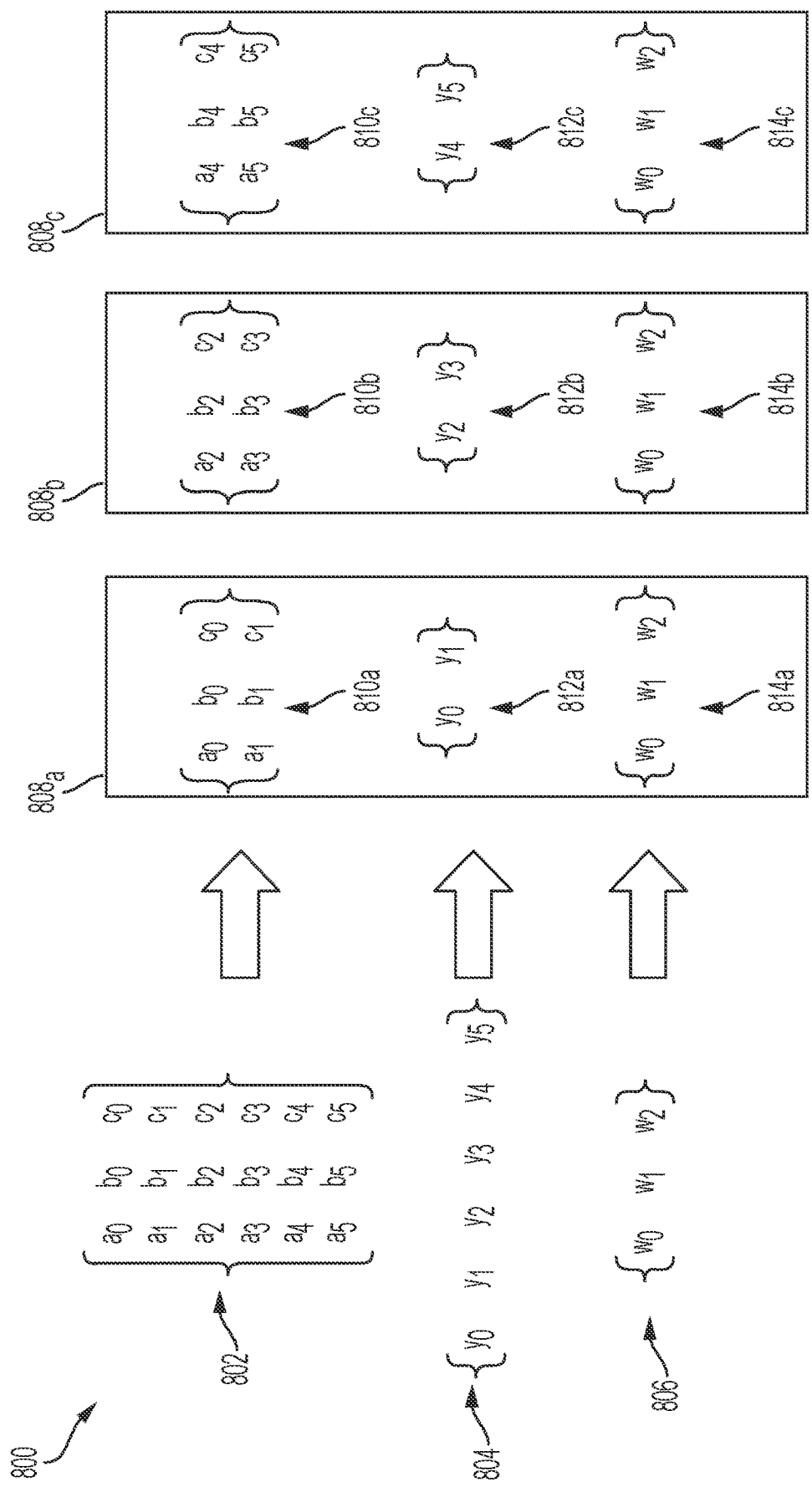
FIG. 8 illustrates an example wherein data structures are divided across processes via an auto parallelization process employed by the system of FIG. 1, in accordance with at least one non-limiting aspect of the present disclosure.

Referring now to FIG. 8, an example wherein data structures are divided across processes via an auto parallelization process employed by the system 100 of FIG. 1 is depicted in accordance with at least one non-limiting aspect of the present disclosure. According to the non-limiting aspect of FIG. 8, certain data structures, such as samples 802 and labels 804, can be distributed across a plurality of computing devices $808_{a-c}$ to enhance processing efficiency. For example, data structures, such as samples 802, can be subdivided into groups $810_{a-c}$ and distributed across the plurality of processors $808_{a-c}$. Likewise, data structures, such as labels 804, can be subdivided into groups $812_{a-c}$ and distributed across the plurality of processors $808_{a-c}$. The data structures 802, 804 can be distributed via a "1D" block distribution, that is, a distribution of rows or columns of matrix of data structures 802, 804 to different processes, which can be performed by different computing devices $808_{a-c}$. Such distributions can be performed due to the aforementioned compiler process 200 (FIG. 2) and more specifically, the type inferencing process 206 (FIGS. 2 and 3) performed by the system 100 of FIG. 1. Accordingly, the auto parallelization enabled by the system of FIG. 1, to allow concurrent operations to proceed in parallel when they do not access the same parts of the data structure. Notably, although certain data structures 802, 804 can be distributed, other data structures 806 can be replicated across the plurality of computing devices $808_{a-c}$. The parallelization engine 114 and auto parallelization process 210 can determine which data structures 802, 804, 806 can be distributed and thus, can transform the input program 115 (FIG. 1) for the distributed data layout 800.

Figure 9:
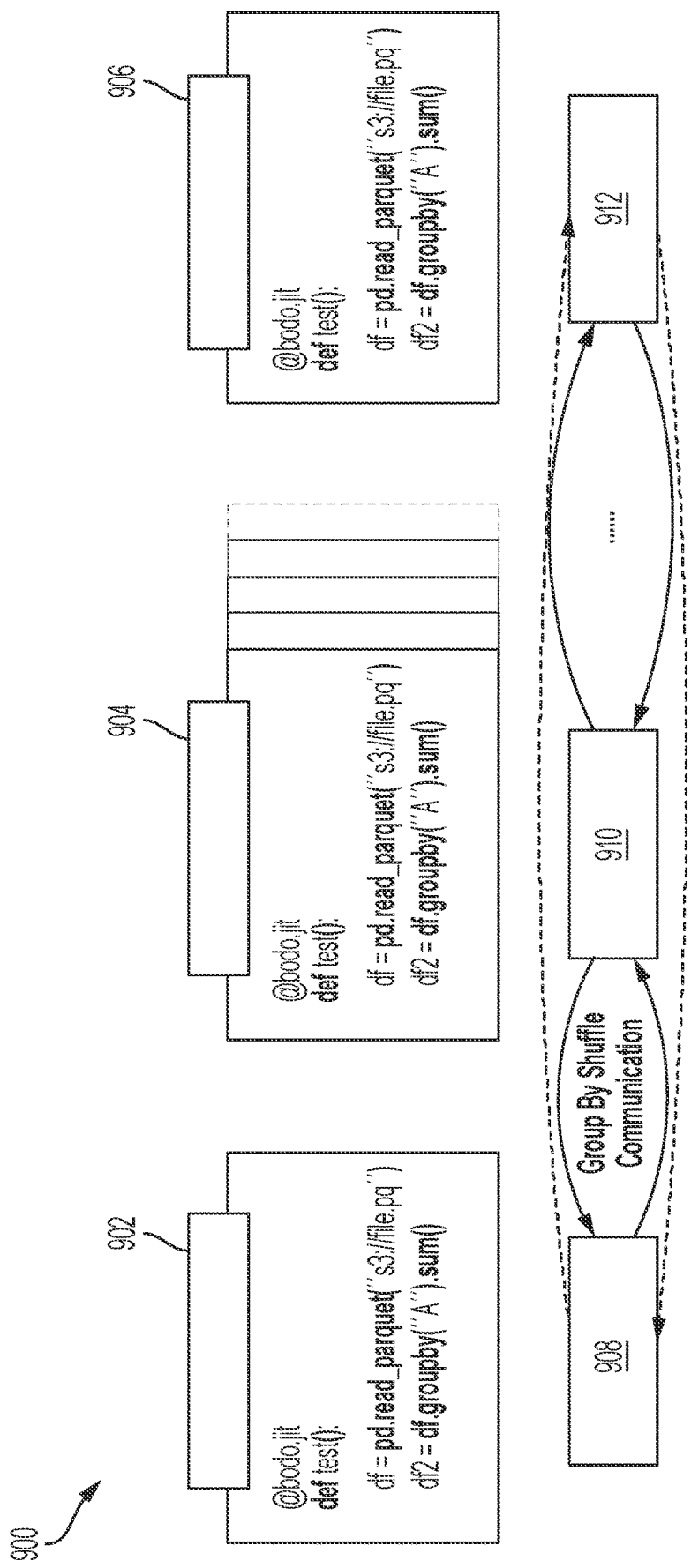
FIG. 9 illustrates an example wherein a program runs in parallel processes via an auto parallelization process employed by the system of FIG. 1, in accordance with at least one non-limiting aspect of the present disclosure.

Referring now to FIG. 9, an example 900 wherein a program (e.g., input program 115 of FIG. 1) is compiled via process 200 (FIG. 2) and dissected into parallel processes 902, 904, 906 via an auto parallelization process 210 (FIG. 2) employed by the system 100 of FIG. 1. According to the non-limiting aspect of FIG. 9, the input program 115 (FIG. 1) can be scripted in Python, type-inferenced via the compiling process 200 (FIGS. 2 and 3), and processed via a parallelization engine 114 (FIG. 1). Specifically, FIG. 9 illustrates how a Python program 115 (FIG. 1) can be parallelized into separate processes 902, 904, 906, which can be run on separate computing devices $808_{a-c}$ (FIG. 8).

Each process 902, 904, 906 can include a chunk of the data 908, 910, 912, and the processes 902, 904, 906 can be configured to communicate with one another to exchange data chunks 908, 910, 912, as necessary.

Various aspects of the subject matter described herein are set out in the following numbered clauses:

Clause 1: A system configured to convert human-readable source code into computer-readable source code, the system including a processor and a memory configured to store a compiling engine that, when executed by the processor, causes the processor to: receive an input program including human-readable source code, wherein the human-readable source code includes a complex function; type inference the complex function to infer a first set of undefined data types for the variables in the input program; transform the type inferenced complex function and infer types a number of times, wherein the number of times is based, at least in part, on the number of typing issues of the program associated with the input program, and wherein each transformation includes replacing operations with typing issues and forcing certain variables to be constant in the function among others; type inference the transformed complex function, thereby inferring a full set of precise data types for the input program; and generate an output program including machine-readable code, wherein the machine-readable code is fully optimized using the full set of precise data types.

Clause 2: The system according to clause 1, wherein the memory is further configured to store an auto-parallelization engine that, when executed by the processor, causes the processor to: detect parallelizable computation associated with the input program; generate a plurality of tasks associated with the detected problem; generate a plurality of sub-tasks associated with each of the generated tasks; transmit each of the sub-tasks of the plurality to each computing device or a plurality of computing devices, wherein each computing device of the plurality is configured to process the plurality of sub-tasks; and receive a plurality of resolutions associated with each of the plurality of sub-tasks from each of the plurality of computing devices.

Clause 3: The system according to either of clauses 1 or 2, wherein the compiling engine is further configured such that, when executed by the processor, the compiling engine causes the processor to generate the output program based, at least in part, on the plurality of resolutions received from the plurality of computing devices.

Clause 4: The system according to any of clauses 1-3, wherein the input program includes sequential code, and wherein the memory is further configured to store an auto-parallelization engine that, when executed by the processor, causes the processor to: automatically convert the sequential code of the input program into a plurality of parallel versions of the code; and distribute the plurality of parallel versions of the code across a plurality of computing devices configured to process each parallel version of the plurality.

Clause 5: The method according to any of clauses 1-4, wherein, when executed by the processor, the auto-parallelization engine further causes the processor to: receive processed outputs from each computing device of the plurality; and integrate the processed outputs according to a dependency determined by the auto-parallelization engine.

Clause 6: The system according to any of clauses 1-5, wherein the undefined data type is a partial data type.

Clause 7: The system according to any of clauses 1-6, wherein the undefined data type is an imprecise data type.

Clause 8: A method of converting human-readable source code into computer-readable source code, the method including: receiving, via a processor of a compiling system, an input program including human-readable source code, wherein the human-readable source code includes complex functions; type inferencing, via the processor, the complex function to infer a first of undefined data types for the input program; transform the type inferenced complex function and infer types a number of times, wherein the number of times is based, at least in part, on the number of typing issues of the program associated with the input program, and wherein each transformation includes replacing operations with typing issues and forcing certain variables to be constant in the function among others. type inferencing the transformed complex function, thereby inferring a full set of precise data types for the input program; and generating an output program including machine-readable code, wherein the machine-readable code is fully optimized using the full set of precise data types.

Clause 9: The method according to clause 8, further including: detecting, via the processor, parallizable computation associated with the input program; generating, via the processor, a plurality of tasks associated with the detected problem; generating, via the processor, a plurality of sub-tasks associated with each of the generated tasks; transmitting, via the processor, each of the sub-tasks of the plurality to each computing device or a plurality of computing devices, wherein each computing device of the plurality is configured to process the plurality of sub-tasks; and receiving, via the processor, a plurality of resolutions associated with each of the plurality of sub-tasks from each of the plurality of computing devices.

Clause 10: The method according to either of clauses 8 or 9, wherein the generation of the output program is based, at least in part, on the plurality of resolutions received from the plurality of computing devices.

Clause 11: The method according to any of clauses 8-10, wherein the input program comprises sequential code, and wherein the method further comprises: automatically converting, via the processor, the sequential code of the input program into a plurality of parallel versions of the code; and distributing, via the processor, the plurality of parallel versions of the code across a plurality of computing devices configured to process each parallel version of the plurality.

Clause 12: The method according to any of clauses 8-11, further comprising receiving, via the processor, processed outputs from each computing device of the plurality; and integrating, via the processor, the processed outputs according to a dependency determined by the auto-parallelization engine.

Clause 13: The method according to any of clauses 8-10, wherein the undefined data type is a partial data type.

Clause 14: The method according to any of clauses 8-10, wherein the undefined data type is an imprecise data type.

Clause 15: A system configured to convert human-readable source code into computer-readable source code, the system comprising a user subsystem configured to generate an input program, and a compiling subsystem communicably coupled to the user subsystem, wherein the compiling subsystem comprises a processor and a memory configured to store a compiling engine that, when executed by the processor, causes the processor to receive the input program comprising human-readable source code from the user subsystem, wherein the human-readable source code comprises a complex function, type inference the complex function to infer a first set of undefined data types for the variables in the input program, transform the type inferenced complex function and infer types a number of times, wherein the number of times is based, at least in part, on the number of typing issues of the program associated with the input program, and wherein each transformation comprises replacing operations with typing issues and forcing certain variables to be constant in the function among others, type inference the transformed complex function, thereby inferring a full set of precise data types for the input program, and generate an output program comprising machine-readable code, wherein the machine-readable code is fully optimized using the full set of precise data types.

Clause 16: The system according to clause 15, wherein the memory is further configured to store an auto-parallelization engine that, when executed by the processor, causes the processor to detect parallelizable computation associated with the input program, generate a plurality of tasks associated with the detected problem, generate a plurality of sub-tasks associated with each of the generated tasks, transmit each of the sub-tasks of the plurality to each computing device or a plurality of computing devices, wherein each computing device of the plurality is configured to process the plurality of sub-tasks, and receive a plurality of resolutions associated with each of the plurality of sub-tasks from each of the plurality of computing devices.

Clause 17: The system according to either of clauses 15 or 16, wherein the compiling engine is further configured such that, when executed by the processor, the compiling engine causes the processor to generate the output program based, at least in part, on the plurality of resolutions received from the plurality of computing devices.

Clause 18: The system according to any of clauses 15-17, wherein the input program comprises sequential code, and wherein the memory is further configured to store an auto-parallelization engine that, when executed by the processor, causes the processor to automatically convert the sequential code of the input program into a plurality of parallel versions of the code, and distribute the plurality of parallel versions of the code across a plurality of computing devices configured to process each parallel version of the plurality.

Clause 19: The system according to any of clauses 15-18, wherein, when executed by the processor, the auto-parallelization engine further causes the processor to receive processed outputs from each computing device of the plurality, and integrate the processed outputs according to a dependency determined by the auto-parallelization engine.

Clause 20: The system according to any of clauses 15-19, wherein the undefined data type is a partial data type and wherein the undefined data type is an imprecise data type.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various exemplary and illustrative aspects. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications or combinations of any of the exemplary aspects may be made without departing from the scope of the present disclosure. In addition, persons skilled in the art will recognize, or be able to ascertain using no more than routine experimentation, many equivalents to the various aspects of the present disclosure described herein upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

What is claimed is:

1. A system configured to convert human-readable source code into computer-readable source code, the system comprising a processor and a memory configured to store a compiling engine that, when executed by the processor, causes the processor to:

receive an input program comprising human-readable source code, wherein the human-readable source code comprises a complex function comprising a type unstable variable;

type inference the complex function to infer a first set of undefined data types for the variables in the input program;

transform the type inferenced complex function by inferring types a number of times, wherein the number of times is based, at least in part, on the number of typing issues of the program associated with the input program, and wherein each transformation comprises replacing operations with typing issues and forcing the unstable variable to be constant in the function, wherein each typing issue of the number of typing issues comprises a variable that cannot be assigned a precise type;

type inference the transformed complex function, thereby inferring a full set of precise data types for the unstable variable; and generate an output program comprising machine-readable code, wherein the machine-readable code is fully optimized using the full set of precise data types.

2. The system of claim 1, wherein the memory is further configured to store an auto-parallelization engine that, when executed by the processor, causes the processor to:

detect parallelizable computation associated with the input program;

generate a plurality of tasks associated with the detected parallelizable computation;

generate a plurality of sub-tasks associated with each of the generated tasks;

transmit each of the sub-tasks of the plurality to each computing device or a plurality of computing devices, wherein each computing device of the plurality is configured to process the plurality of sub-tasks; and receive a plurality of resolutions associated with each of the plurality of sub-tasks from each of the plurality of computing devices.

3. The system of claim 2, wherein the compiling engine is further configured such that, when executed by the processor, the compiling engine causes the processor to generate the output program based, at least in part, on the plurality of resolutions received from the plurality of computing devices.

4. The system of claim 2, wherein the input program comprises sequential code, and wherein the memory is further configured to store an auto-parallelization engine that, when executed by the processor, causes the processor to:

automatically convert the sequential code of the input program into a plurality of parallel versions of the code; and distribute the plurality of parallel versions of the code across a plurality of computing devices configured to process each parallel version of the plurality.

5. The system of claim 4, wherein, when executed by the processor, the auto-parallelization engine further causes the processor to:

receive processed outputs from each computing device of the plurality; and integrate the processed outputs according to a dependency determined by the auto-parallelization engine.

6. The system of claim 1, wherein the undefined data type is a partial data type.

7. The system of claim 1, wherein the undefined data type is an imprecise data type.

8. A method of converting human-readable source code into computer-readable source code, the method comprising:
receiving, via a processor of a compiling system, an input program comprising human-readable source code, wherein the human-readable source code comprises a complex function comprising a type unstable variable;
type inferencing, via the processor, the complex function to infer a first of undefined data types for the input program;
transforming the type inferenced complex function by inferring types a number of times, wherein the number of times is based, at least in part, on the number of typing issues of the program associated with the input program, and wherein each transformation comprises replacing operations with typing issues and forcing the unstable variable to be constant in the function, wherein each typing issue of the number of typing issues comprises a variable that cannot be assigned a precise type;
type inferencing the transformed complex function, thereby inferring a full set of precise data types for the unstable variable; and
generating an output program comprising machine-readable code, wherein the machine-readable code is fully optimized using the full set of precise data types.

9. The method of claim 8, further comprising:
detecting, via the processor, parallizable computation associated with the input program;
generating, via the processor, a plurality of tasks associated with the detected parallelizable computation;
generating, via the processor, a plurality of sub-tasks associated with each of the generated tasks;
transmitting, via the processor, each of the sub-tasks of the plurality to each computing device or a plurality of computing devices, wherein each computing device of the plurality is configured to process the plurality of sub-tasks; and
receiving, via the processor, a plurality of resolutions associated with each of the plurality of sub-tasks from each of the plurality of computing devices.

10. The method of claim 9, wherein the generation of the output program is based, at least in part, on the plurality of resolutions received from the plurality of computing devices.

11. The method of claim 9, wherein the input program comprises sequential code, and wherein the method further comprises:
automatically converting, via the processor, the sequential code of the input program into a plurality of parallel versions of the code; and
distributing, via the processor, the plurality of parallel versions of the code across a plurality of computing devices configured to process each parallel version of the plurality.

12. The method of claim 11, further comprising:
receiving, via the processor, processed outputs from each computing device of the plurality; and
integrating, via the processor, the processed outputs according to a dependency determined by an auto-parallelization engine.

13. The method of claim 8, wherein the undefined data type is a partial data type.

14. The method of claim 8, wherein the undefined data type is an imprecise data type.

15. A system configured to convert human-readable source code into computer-readable source code, the system comprising:
a user subsystem configured to generate an input program; and
a compiling subsystem communicably coupled to the user subsystem, wherein the compiling subsystem comprises a processor and a memory configured to store a compiling engine that, when executed by the processor, causes the processor to:
receive the input program comprising human-readable source code from the user subsystem, wherein the human-readable source code comprises a complex function comprising a type unstable variable;
type inference the complex function to infer a first set of undefined data types for the variables in the input program;
transform the type inferenced complex function by inferring types a number of times, wherein the number of times is based, at least in part, on the number of typing issues of the program associated with the input program, and wherein each transformation comprises replacing operations with typing issues and forcing the unstable variable to be constant in the function, wherein each typing issue of the number of typing issues comprises a variable that cannot be assigned a precise type;
type inference the transformed complex function, thereby inferring a full set of precise data types for the unstable variable; and
generate an output program comprising machine-readable code, wherein the machine-readable code is fully optimized using the full set of precise data types.

16. The system of claim 15, wherein the memory is further configured to store an auto-parallelization engine that, when executed by the processor, causes the processor to:
detect parallelizable computation associated with the input program;
generate a plurality of tasks associated with the detected parallelizable computation;
generate a plurality of sub-tasks associated with each of the generated tasks;
transmit each of the sub-tasks of the plurality to each computing device or a plurality of computing devices, wherein each computing device of the plurality is configured to process the plurality of sub-tasks; and
receive a plurality of resolutions associated with each of the plurality of sub-tasks from each of the plurality of computing devices.

17. The system of claim 16, wherein the compiling engine is further configured such that, when executed by the processor, the compiling engine causes the processor to generate the output program based, at least in part, on the plurality of resolutions received from the plurality of computing devices.

18. The system of claim 16, wherein the input program comprises sequential code, and wherein the memory is further configured to store an auto-parallelization engine that, when executed by the processor, causes the processor to:
automatically convert the sequential code of the input program into a plurality of parallel versions of the code; and
distribute the plurality of parallel versions of the code across a plurality of computing devices configured to process each parallel version of the plurality.

19. The system of claim 18, wherein, when executed by the processor, the auto-parallelization engine further causes the processor to:
- receive processed outputs from each computing device of the plurality; and
- integrate the processed outputs according to a dependency determined by the auto-parallelization engine.

20. The system of claim 1, wherein the undefined data type is a partial data type and wherein the undefined data type is an imprecise data type.

* * * * *